US012260757B2

(12) United States Patent
Ho et al.

(10) Patent No.: US 12,260,757 B2
(45) Date of Patent: Mar. 25, 2025

(54) BIDIRECTIONAL INTERACTIVE TRAFFIC-CONTROL MANAGEMENT SYSTEM

(71) Applicant: THI Consultants Inc., Taipei (TW)

(72) Inventors: Chi-Hong Ho, Taipei (TW); Jun-Shian Lee, Taipei (TW); Hsin-Chia Lin, Taipei (TW); Chih-Che Su, Taipei (TW); Yi-Dar Lin, Taipei (TW); I-Ying Chen, Taipei (TW)

(73) Assignee: THI CONSULTANTS INC., Taipei (TW)

( * ) Notice: Subject to any disclaimer, the term of this patent is extended or adjusted under 35 U.S.C. 154(b) by 320 days.

(21) Appl. No.: 17/494,210

(22) Filed: Oct. 5, 2021

(65) Prior Publication Data

US 2022/0108611 A1 Apr. 7, 2022

(30) Foreign Application Priority Data

Oct. 5, 2020 (TW) ................................ 109134424

(51) Int. Cl.
*G08G 1/00* (2006.01)
*G08G 1/01* (2006.01)
*G08G 1/081* (2006.01)
*G08G 1/0967* (2006.01)
*G08G 1/0968* (2006.01)

(52) U.S. Cl.
CPC ..... *G08G 1/096822* (2013.01); *G08G 1/0141* (2013.01); *G08G 1/081* (2013.01); *G08G 1/096783* (2013.01); *G08G 1/096844* (2013.01); *G08G 1/096855* (2013.01); *G08G 1/096883* (2013.01)

(58) Field of Classification Search
CPC .......... G08G 1/096822; G08G 1/0141; G08G 1/081; G08G 1/096783; G08G 1/096844; G08G 1/096855; G08G 1/096883; G08G 1/0112; G08G 1/0116; G08G 1/0133; G08G 1/082; G08G 1/096775
See application file for complete search history.

(56) References Cited

U.S. PATENT DOCUMENTS

| | | | | |
|---|---|---|---|---|
| 2018/0286224 | A1* | 10/2018 | Brodski | G08G 1/0129 |
| 2018/0299290 | A1* | 10/2018 | Slavin | G08G 1/0145 |
| 2020/0211374 | A1* | 7/2020 | Liu | G08G 1/0133 |
| 2020/0242922 | A1* | 7/2020 | Dulberg | G08G 1/012 |

* cited by examiner

*Primary Examiner* — James M McPherson
(74) *Attorney, Agent, or Firm* — Muncy, Geissler, Olds & Lowe, P.C.

(57) ABSTRACT

A bidirectional interactive traffic-control management system includes a road and traffic network information subsystem, an urban traffic control subsystem and a road-users' route guidance subsystem. The first subsystem forms real-time traffic information of all road sections in the digital urban traffic-control road network. The second subsystem generates a real-time optimal signal timing plan for each intersection based on the real-time traffic information of its connecting road sections. The third subsystem generates a real-time optimal route plan based on the real-time travel information of all road-users, the real-time traffic information of all road sections, and the real-time optimal signal timing plan of each intersection of the road network. It then transmits the optimal route plan into a navigator in a mobile device of a road-user or in an on-board-unit of a moving vehicle or via a roadside unit for transmission.

16 Claims, 5 Drawing Sheets

BIDIRECTIONAL INTERACTIVE TRAFFIC-CONTROL MANAGEMENT SYSTEM

FIELD OF THE INVENTION

The present invention is related to a brand new urban traffic-signal control system, especially a bidirectional interactive traffic-control management system including a route guidance function for road-users.

BACKGROUND OF THE INVENTION

For any modern city, in order to effectively manage its road traffic to improve the operation efficiency of the road network and to ensure the traffic safety of road-users, a computerized traffic signal control system (hereinafter referred to as urban traffic control system) covering the whole urban road network will always be built.

Current urban traffic control systems are usually composed of a traffic control center provided with a main control computer, a timing-plan generation computer, some peripheral devices, and an electronic traffic control map display, and various vehicle detectors installed in some road sections or at some intersections, as well as traffic signal controllers, signal heads, and signal poles installed at intersections, connected with a data communication system.

Normally the generation of the real-time signal timing plan for each intersection in the road network is done by transmitting traffic flow information of each road section and/or of each intersection in the road network through various vehicle detectors located in some road sections or at some intersections and then by aggregating and computing those traffic flow information through the computation computer located in the traffic control center or regional control sub-centers. Then, the real-time signal timing plan is transmitted to the traffic signal controller located at each intersection via the data communication system, so as to drive the traffic lights into operation and then to control the traffic flow at each intersection.

However, for most of the urban traffic control systems, conventionally, vehicle detectors must be installed at least on some road sections or at some intersections in order to obtain the real-time traffic flow information of the road network, and these vehicle detectors to be installed are not only numerous and costly, but also the cost of their daily operation, adjustment and maintenance is very expensive, thus resulting in a heavy financial burden inevitably.

In addition, road-users often use a so-called navigator/navigation module or route guidance APP imbedded in their mobile devices, e.g. mobile phones, etc., or in on-board-units of their vehicles as their route planning tools to reach their trip destinations. However, current route planning tools can only provide the road-users with general or rough but not precise route suggestions, because those planning tools can only perform relatively simple calculation without including any signal timing information therein and thus usually are not capable of providing the real optimal travel routes, and varying degrees of errors which would occur in the calculation process of the optimal travel routes that are difficult to overcome. For example, those route planning tools may possibly navigate the vehicles of lots of road-users to one specific arterial road, which would cause or worsen the traffic congestion of that arterial road.

Therefore, how to provide a bidirectional interactive traffic-control management system with both functions of real-time optimal signal timing plan generation and real-time optimal route guidance generation is definitely an important issue to be solved. Accordingly, the present invention has developed a new real-time integrated and interactive system which may avoid the above-described drawbacks, may significantly enhance the performance of both existing traffic control systems and existing vehicle navigation/route guidance systems which are now operated separately, and may take into account economic efficiency as a whole. Therefore, the present invention then has been developed and presented.

SUMMARY OF THE INVENTION

According to the embodiment of the present invention, the present invention provides a bidirectional interactive traffic-control management system comprising: a road and traffic network information subsystem, an urban traffic control subsystem and road-users' route guidance subsystem. The road and traffic network information subsystem includes a digital urban traffic-control road network and a road-users' travel information input module, where the digital urban traffic-control road network is a vector-type structure including a plurality of road sections and a plurality of intersections including various road geometric characteristics and traffic control attributes. The road-users' travel information input module is used to collect real-time travel information of road-users on the plurality of road sections of the digital urban traffic-control road network, and to overlay it into the digital urban traffic-control road network to form a real-time integrated traffic information in the plurality of road sections of the digital urban traffic-control road network.

The urban traffic control subsystem is used for generating a real-time optimal signal timing plan for each intersection of the digital urban traffic-control road network according to the real-time integrated traffic information of all road sections which are linked together by intersections; and the road-users' route guidance subsystem is used for generating a real-time optimal route plan for each road-user by calculating the real-time travel information of all road-users, the real-time integrated traffic information of each road section, and the real-time optimal signal timing plan of each intersection in the digital urban traffic-control road network generated by the urban traffic control subsystem, and transmitting the real-time optimal route plan to a navigator/navigation module which is imbedded in a mobile device of a road-user or in an OBU(on board unit) of a moving vehicle or via a roadside unit; wherein the real-time travel information of road-users includes information of trip origin and destination points and the instant location of each road-user driving in any road section of the digital urban traffic-control road network.

In one embodiment, wherein the real-time travel information of road-users further includes information about a traffic accident information, a traffic incident information or a traffic congestion event information, a road construction information and/or weather information, and/or a driving track information, and/or a route choice preference information.

In one embodiment, wherein the urban traffic control subsystem further includes an intersection arrival-flows prediction module for obtaining a real-time average vehicle speed in each road section, an estimated arrival time at each intersection, and/or a real-time arrival-flows allocation of each intersection according to the real time integrated traffic information of each road section, so as to generate a time-space arrival-flows matrix or pattern of each intersection of the digital urban traffic-control road network.

In one embodiment, wherein the urban traffic control subsystem further includes a timing plans generation module for generating multiple feasible signal timing plans for each intersection of the digital urban traffic-control road network according to the time-space arrival-flows matrix or pattern of each intersection and signal timing restrictions of each intersection.

In one embodiment, wherein the signal timing restrictions of each intersection include a phasing type, a yellow period, an all-red period, a pedestrian green period, a pedestrian flashing green period, a minimum green period of each phase, and a maximum green period for each phase.

In one embodiment, wherein the urban traffic control subsystem further includes a timing plans optimization module for generating a real-time optimal signal timing plan among the multiple feasible timing plans of each intersection of the digital urban traffic-control road network by optimizing an objective function of the multiple feasible signal timing plans according to a pre-determined traffic control objective.

In one embodiment, wherein the pre-determined traffic control objective is a minimum total delay time, or a minimum total travel time, or a minimum total number of stops or a minimum queue length, or a combination thereof in the digital urban traffic-control road network.

In one embodiment, wherein the real-time optimal signal timing plan of each intersection of the digital urban traffic-control road network is transmitted to a traffic signal control facility at each intersection.

In one embodiment, wherein the urban traffic control subsystem further includes an electronic traffic control map display module for showing the real-time optimal signal timing plan of each intersection generated by the timing plans optimization module and/or the real-time average vehicle speed in each road section of the digital urban traffic-control road network.

In one embodiment, wherein the update frequency of the real-time optimal signal timing plan is determined according to the input frequency of the real-time travel information of road-users and/or the calculation frequency of the timing plans optimization module.

In one embodiment, wherein the road-users' route guidance subsystem further includes an road section and intersection calculation module for calculating the real-time average vehicle speed in each road section, an estimated arrival time at each intersection, a travel time in each road section, and a delay time at each intersection based on the real-time integrated traffic information of each road section, the length of each road section, and the real-time optimal signal timing plan of each intersection of the digital urban traffic-control road network generated by the urban traffic control subsystem.

In one embodiment, wherein the road-users' route guidance subsystem further includes an alternative routes generation module for generating multiple feasible route plans by calculating the real-time integrated traffic information of each road section, the real-time average vehicle speed in each road section, the estimated arrival time at each intersection, the travel time in each road section, and the delay time at each intersection of the digital urban traffic-control road network.

In one embodiment, wherein the road-users' route guidance subsystem further includes a route guidance optimization module for generating the real-time optimal route plan by optimizing an objective function among the multiple feasible route plans according to a pre-determined route planning objective.

In one embodiment, where the pre-determined route planning objective is a minimum total travel time, or a minimum total travel distance and/or the route choice preference information.

In one embodiment, wherein the real-time travel information of road-users is provided by the navigator/navigation module which is imbedded in road-users' mobile devices, or in the OBUs (on board units) of moving vehicles, or via the roadside units.

In one embodiment, wherein the road-users' route guidance subsystem further includes an optimal routes output module for transmitting the real-time optimal route plans to a navigator/navigation module which is imbedded in road-users' mobile devices or in the OBUs of moving vehicles, or via a roadside unit according to the input frequency of the real-time travel information of the road-users, the calculation frequency of the route guidance optimization module, and/or a necessity evaluation.

In one embodiment, wherein the necessity evaluation is used to calculate and evaluate the difference between the real-time optimal route plan and the existing route plan of the road user and evaluate the difference based on a threshold value, and then to selectively transmit the real-time optimal route plan or maintain the existing route plan of the road user according to the size of the difference.

In one embodiment, wherein the road-users' route guidance subsystem further includes a route guidance database for storing all optimal route plans generated by the route guidance optimization module, the real-time average speed of each road section, the estimated arrival time at each intersection, and the travel time in each road section, and transmitting them to the road section and intersection calculation module, the alternative routes generation module and/or the route guidance optimization module for the purpose of next stage optimal route planning As described above, the present invention has following advantages:

Under the systematic framework and functions of the present invention, a future urban traffic control center will be able to fully monitor various real-time road traffic conditions and traffic-related events (e.g. traffic congestions, traffic accidents, road constructions, adverse weather conditions . . . etc.) in the urban road network, and thus can introduce various corresponding reaction plans in advance.

Under the systematic framework and functions thereof of the present invention, a future urban traffic control center can also transmit the information about various real-time road and traffic events in the urban road network to the road-users for their reference and usage, so that they can avoid the congested road sections where traffic accidents occurred or road construction is underway, and thus improve the operation efficiency of the urban road network.

Under the systematic framework and functions thereof of the present invention, future urban traffic control center will be able to collect and process the real-time travel information such as the trip origins and destinations of road-users and their driving tracks in the road network, together with the optimal signal timing plans generated by the traffic control center, to further develop a more accurate route guidance system for all road-users, and then to transmit the information generated from said system back to the road-users for their moving reference, so as to provide the road-users with specific feedback measures about their traffic movement information.

DETAILED DESCRIPTIONS OF PREFERRED EMBODIMENTS

For the sake of clarity and convenience to illustrate the figures of the present invention, the components in the figures may be enlarged or reduced in size and scale. For ease of understanding, the same components in the following examples are illustrated by the same numeric reference.

Figure 1:
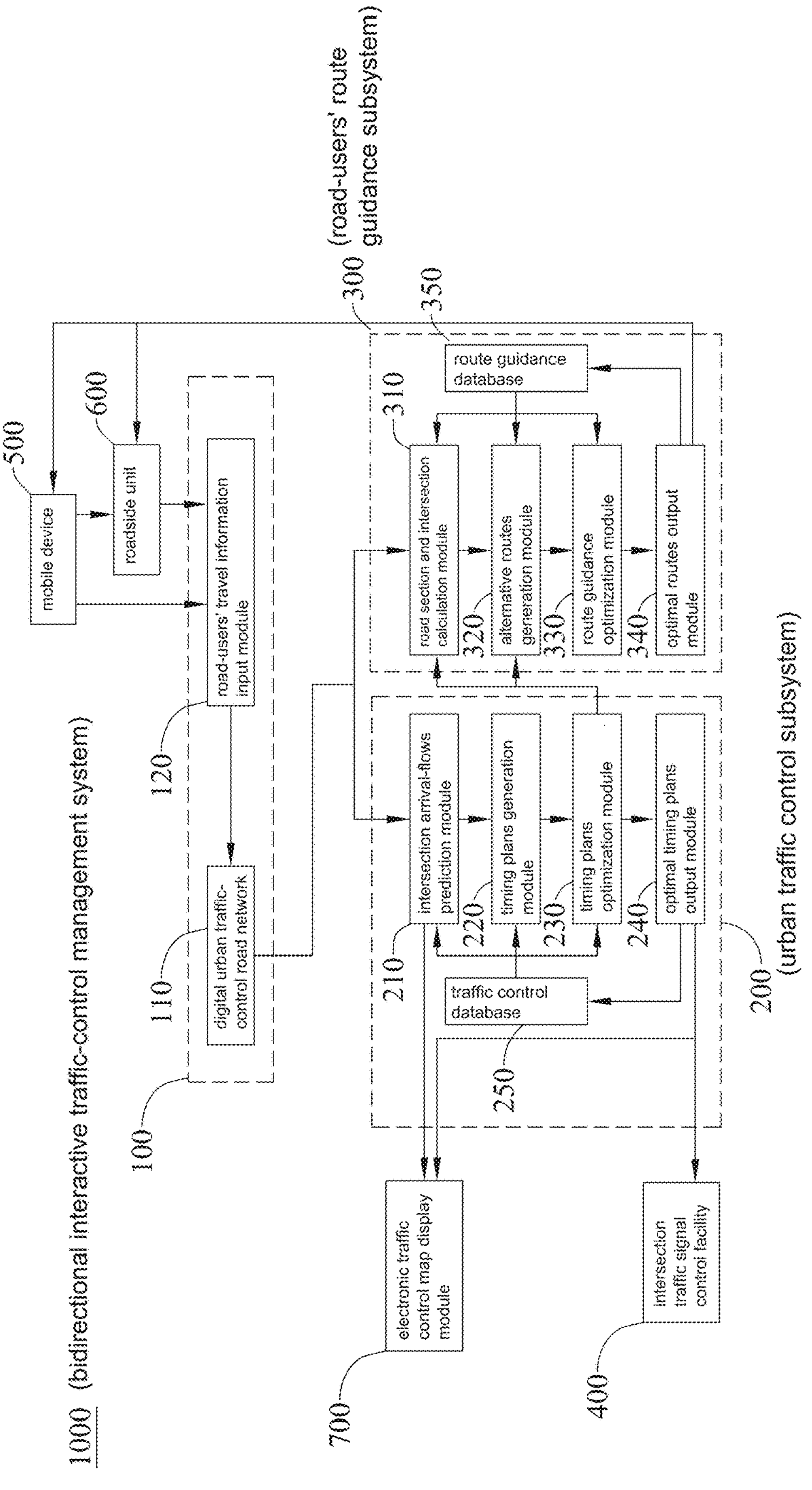
FIG. 1 is a block diagram showing the framework of a bidirectional interactive traffic-control management system of the present invention.

Please refer to FIG. 1, it is a block diagram of a bidirectional interactive traffic-control management system 1000 of the present invention. The bidirectional interactive traffic-control management system 1000 includes a road and traffic network information subsystem 100, an urban traffic control subsystem 200, and a road-users' route guidance subsystem 300.

The road and traffic network information subsystem 100 includes a digital urban traffic-control road network 110 and a road-users' travel information input module 120. The digital urban traffic-control road network 110 is a vector-type structure composed of a plurality of road sections and a plurality of intersections featuring various road geometric characteristics and traffic control attributes.

The road-users' travel information input module 120 is coupled with the digital urban traffic-control road network 110. The road-users' travel information input module 120 collects real-time travel information of road-users on each road section of the digital urban traffic-control road network 110, and to overlay it into the digital urban traffic-control road network 110 in order to form a real-time integrated traffic information of each road section of the digital urban traffic-control road network 110. The real-time travel information of road-users includes information of trip origin and destination points of road-users and the instant location information of road-users driving on each road section of the digital urban traffic-control road network.

In another embodiment of the present invention, the real-time travel information of road-users may include information about traffic accidents, traffic incidents or traffic congestion events, road construction and/or weather information, and/or driving track information, and/or route choice preference information (e.g. avoiding toll roads, avoiding downtown areas, avoiding signalized intersections, prioritizing arterials). In addition, said travel information of road-users may be provided to the road-users' travel information input module 120 by the road-users' mobile device 500 (e.g. a navigator/navigation module which is imbedded in the road-user's mobile phone or intelligent watch, an on-board-unit of a moving vehicle, etc.) and/or via a roadside unit 600. In practice, road-users can use various data transmission media, such as mobile data communication network of the mobile device 500 or Wi-Fi/Wi-max network, to transmit road-users' travel information into road-users' travel information input module 120, or via the roadside unit 600 to transmit it to road-users' travel information input module 120. In this way, a variety of data transmission paths can be provided to transmit, as complete and as real-time as possible, the road-users' travel information, such as traffic accidents or incidents, traffic congestion, road construction information and/or weather information.

An urban traffic control subsystem 200 is coupled with the road and traffic network information subsystem 100. The urban traffic control subsystem 200 includes an intersection arrival-flows prediction module 210, a timing plans generation module 220, a timing plans optimization module 230, an optimal timing plans output module 240, and a traffic control database 250. The urban traffic control subsystem 200 calculates the real-time integrated traffic information of each road section to generate the real-time optimal signal timing plan for each intersection in the digital urban traffic-control road network.

The intersection arrival-flows prediction module 210 generates the real-time average vehicle speed of each road section, the estimated arrival time at each intersection, and/or the real-time arrival-flows allocation of each intersection by calculating the real-time integrated traffic information of each road section, and further generates a time-space arrival-flows matrix or pattern of each intersection of the digital urban traffic-control road network.

Taking an intersection in the digital urban traffic-control road network as an example, the said real-time arrival-flows allocation of each intersection and the time-space arrival-flows matrix or pattern of each intersection can be realized by the following two working tables:

TABLE 1 the estimation of real-time (e.g. within 4 seconds) arrival-flows allocation at certain intersection

| Upstream road sections adjacent to the intersection | Real-time average vehicle speed of the upstream road section (km/hr) | Real-time average vehicle speed of the upstream road section(converted to m/s) | Distance between each approaching vehicle on the upstream road section and the intersection (m) | Travel time required for each approaching vehicle to reach the intersection (sec.) | Real-time arrival-flows calculation at the intersection | Real-time turning-flows allocation at the intersection |
|---|---|---|---|---|---|---|
| Eastbound approach | 36 | 10.00 | 15, 35, 75, 130, 185, . . . | 1.5, 3.5, 7.5, 13, 18.5, . . . | 2 | Left turn 1<br>Straight 1 |
| Westbound approach | 42 | 11.67 | 14, 30, 43, 88, 132, . . . | 1.27, 2.57, 3.68, 7.54, 11.3, . . . | 3 | Straight 2<br>Right turn 1 |
| Southbound approach | 33 | 9.17 | 11, 20, 29, 36, 74, 105, . . . | 1.2, 2.2, 3.2, 3.9, 8.1, 11.45, . . . | 4 | Left turn 1<br>Straight 2<br>Right turn 1 |
| Northbound approach | 30 | 8.33 | 12, 23, 32, 69, 117, . . . | 1.4, 2.5, 3.9, 8.3, 14.0, . . . | 3 | Straight 2<br>Right turn 1 |

TABLE 1-continued the estimation of real-time (e.g. within 4 seconds) arrival-flows allocation at certain intersection

| Upstream road sections adjacent to the intersection | Real-time average vehicle speed of the upstream road section (km/hr) | Real-time average vehicle speed of the upstream road section(converted to m/s) | Distance between each approaching vehicle on the upstream road section and the intersection (m) | Travel time required for each approaching vehicle to reach the intersection (sec.) | Real-time arrival-flows calculation at the intersection | Real-time turning-flows allocation at the intersection |
|---|---|---|---|---|---|---|

Note:
The "average vehicle speed" and "distance" mentioned in Table 1 are the numbers assumed in examples, and "real time" is "within 4 seconds" as an example.

TABLE 2 the estimation of time-space arrival-flows matrix at certain intersection

| Upstream road sections adjacent to the intersection | Turning of the upstream section | Estimation of arrival-flows in continuous calculation time interval at the intersection: Within 0~4 sec | Within 4~8 sec | Within 8~12 sec | Within 12~16 sec | Within 20~24 sec |
|---|---|---|---|---|---|---|
| Eastbound approach | Left turn | 1 | 0 | 0 | 1 | . . . |
| | Straight | 1 | 0 | 0 | 0 | . . . |
| | Right turn | 0 | 1 | 0 | 0 | . . . |
| Westbound approach | Left turn | 0 | 1 | 0 | 0 | . . . |
| | Straight | 2 | 0 | 0 | 0 | . . . |
| | Right turn | 1 | 0 | 0 | 0 | . . . |
| Southbound approach | Left turn | 1 | 0 | 0 | 0 | . . . |
| | Straight | 2 | 0 | 1 | 0 | . . . |
| | Right turn | 1 | 0 | 0 | 0 | . . . |
| Northbound approach | Left turn | 0 | 0 | 0 | 0 | . . . |
| | Straight | 2 | 0 | 1 | 0 | . . . |
| | Right turn | 1 | 0 | 0 | 0 | . . . |

Note:
"0~4 sec", "4~8 sec", "8~12 sec", and "12~16 sec" in Table 2 refer to the continuous calculation interval indicated in the intersection arrival-flows prediction module 210.

The above Table 1 takes any intersection in the digital urban traffic-control road network as an example. The calculation/estimation process of the real-time arrival-flows allocation of each intersection is described as follows: travel time required for each vehicle to reach the intersection and the real-time arrival-flows at the intersection in the calculation time interval in the intersection arrival-flows prediction module 210 (4-second interval as an example) are obtained by calculating the distance between the current position of each approaching vehicle driving on all the adjacent upstream road sections and the intersection, the real-time average vehicle speed of each road section. In addition, the above Table 2 adopts the calculation/estimation results of Table 1 and shows the detailed calculation/estimation process of the arrival-flows allocation in the continuous calculation interval along the time axis from all upstream approach of the intersection, so as to form the said time-space arrival-flows matrix or pattern of each intersection in the intersection arrival-flows prediction module 210. In addition, for the convenience of description, those two tables (Tables 1 and 2) only use a single intersection as an example for the calculation, and are not used to limit the scope or conditions of the present invention.

The timing plans generation module 220 is coupled with the intersection arrival-flows prediction module 210. The timing plans generation module 220 can generate multiple feasible signal timing plans for each intersection based on the said time-space arrival-flows matrix or pattern and the signal timing restrictions of each intersection. The signal timing restriction of each intersection can be a phasing type, a yellow period, an all-red period, a pedestrian green period and pedestrian flashing green period, and a minimum green period and maximum green period for each phase within a signal cycle.

The timing plans optimization module 230 is coupled with the timing plans generation module 220. The timing plans optimization module 230 firstly calculates the performance index value, based on a set of pre-determined traffic control objective function, for each of the multiple feasible signal timing plans which are developed in the timing plans generation module 220. Then an optimization process of comparing and sorting/sequencing the performance index values of the multiple feasible signal timing plans is conducted, and the real-time optimal signal timing plan of each intersection of the digital urban traffic-control road network can be generated. In practice, the performance index value of the pre-determined traffic control objective function can be obtained by using various mathematical programming techniques, e.g. Linear Search method, Hill-Climbing method, Gradient Search method, Newton-Raphson method, Conjugate Gradient method, Exhaustive Search method, etc.

The pre-determined traffic control objective function can be a linear or non-linear form. Its traffic control objective may be minimum total delay time or minimum total travel time or minimum total number of stops or minimum queue length, or a combination thereof. In addition, the real-time optimal signal timing plan is updated at a frequency based on the input frequency of the road-users' travel information and/or the calculation frequency of the timing plans optimization module 230.

The optimal timing plans output module 240 is coupled with the timing plans optimization module 230. The optimal timing plans output module 240 is used to transmit the real-time optimal signal timing plan of the intersection to the corresponding intersection traffic signal control facility 400 of the intersection to control the subsequent operation of the traffic signal.

The traffic control database 250 is respectively coupled to the intersection arrival-flows prediction module 210, the timing plans generation module 220, the timing plans optimization module 230, and the optimal timing plans output module 240. The traffic control database 250 is used to store the real-time integrated traffic information of all road sections generated by the road-users' travel information input module 120, as well as all real-time optimal signal timing plans generated by the timing plans optimization module 230. The traffic control database 250 then transmits them to the intersection arrival-flows prediction module 210, the timing plans generation module 220, and/or the timing plans optimization module 230 in order to generate the real-time optimal signal timing plans in the next stage.

An electronic traffic control map display module 700 is respectively coupled to the intersection arrival-flows prediction module 210 and the optimal timing plans output module 240. The electronic traffic control map display module 700 displays the real-time optimal signal timing plans generated by the timing plans optimization module 230, and/or real-time average vehicle speed of each road section generated by the intersection arrival-flows prediction 210.

The road-users' route guidance subsystem 300 is respectively coupled to the road and traffic network information subsystem 100 and the urban traffic control subsystem 200. The road-users' route guidance subsystem 300 includes a road section and intersection calculation module 310, an alternative routes generation module 320, a route guidance optimization module 330, an optimal routes output module 340, and a route guidance database 350.

The road-users' route guidance subsystem 300 obtains optimal real-time route plans according to the real-time travel information of road-users, the real-time integrated traffic information of plurality of road sections, and the real-time optimal signal timing plan of each intersection generated by the urban traffic control subsystem 200, and transmit the real-time optimal route plans to a navigator/navigation module which is imbedded in road-users' mobile devices or in an on-board-unit of moving vehicles, or via a nearby roadside unit, for example, the mobile device 500 of road-users or the roadside unit 600.

The road section and intersection calculation module 310 obtains the real-time average vehicle speed of each road section, the estimated arrival time at each intersection, the travel time in each road section, and the delay time at each intersection according to the real-time integrated traffic information of each road section, the length of each road section, and the real-time optimal signal timing plan of each intersection generated by the urban traffic control subsystem 200.

The alternative routes generation module 320 is coupled to the road section and intersection calculation module 310. The alternative routes generation module 320 generates multiple feasible driving route plans by calculating the real-time integrated traffic information of each road section, the real-time average vehicle speed of each road section, the estimated arrival time at each intersection, the travel time in each road section, and the delay time at each intersection.

For example, the alternative routes generation module 320 can set the instant location point from the driving track provided by a road user (i.e. his/her current position) as a starting point (i.e. new trip origin point) of his/her subsequent route. Then on the digital urban traffic-control road network 110, a mathematical programming method of network planning is used to generate multiple feasible alternative routes from the new starting point of the subsequent route of the road user to his/her trip destination point.

Next, the alternative routes generation module 320 will add up the multiple feasible alternative routes, the travel time passing through each road section, and the delay time when crossing each intersection on the subsequent route (according to the optimal timing plan implemented at each intersection), to obtain a predicted value of the total travel time of each subsequent feasible alternative route for the road-user. Accordingly the multiple feasible driving routes described above are obtained.

The route guidance optimization module 330 is coupled to the alternative routes generation module 320. The route guidance optimization module 330 generates the real-time optimal route plan by optimizing an objective function among the multiple feasible route plans according to a pre-determined route planning objective. The pre-determined route planning objective may be the minimum total travel time or the minimum total travel distance, and/or a route choice preference setting. In practice, the calculation method of the route guidance optimization module 330 can be implemented by using various searching methods, such as exhaustive search method or other mathematical methods.

The optimal routes output module 340 is coupled to the route guidance optimization module 330. The optimal routes output module 340 transmits the results of the real-time optimal route plan to the mobile device 500 of the road-users or via the roadside unit 600 in real-time based on the input frequency of the real-time travel information of road-users, the calculation frequency of the route guidance optimization module 330 and/or the necessity evaluation.

It should be noted that the necessity evaluation is to calculate the difference between the real-time optimal route plan and the existing route plan of the road user and to compare with a threshold value, which can be a system default value or predetermined by an administrator. Then the real-time optimal route plan is selectively transmitted; or the existing route plan is maintained according to the size of the difference. For example, in one embodiment of the present invention, if the difference value from the necessity evaluation exceeds the threshold value, the real-time optimal route plan is transmitted; but when the difference value from the necessity evaluation is less than or simply equals to the threshold value, the existing route plan is maintained.

The route guidance database 350 is respectively coupled to the road section and intersection calculation module 310, the alternative routes generation module 320, the route guidance optimization module 330, and the optimal routes output module 340. The route guidance database 350 is used to store the real-time average vehicle speed of each road section, the estimated arrival time at each intersection, the travel time in each road section and the delay time at each intersection calculated by the road section and intersection calculation module 310, and the real-time optimal route plan generated by the route guidance optimization module 330. The route guidance database 350 then transmits them to the road section and intersection calculation module 310, the alternative routes generation module 320, and/or the route guidance optimization module 330, for the purpose of next stage optimal route planning An Intersection traffic signal control facility 400 is coupled with the optimal timing plans output module 240. For example, each intersection traffic signal control facility 400 continuously receives, updates, and stores the real-time optimal signal timing plan in real-time. Each intersection traffic signal control facility 400 then implements the received real-time optimal signal timing plan on time at a pre-determined start time.

Figure 2:
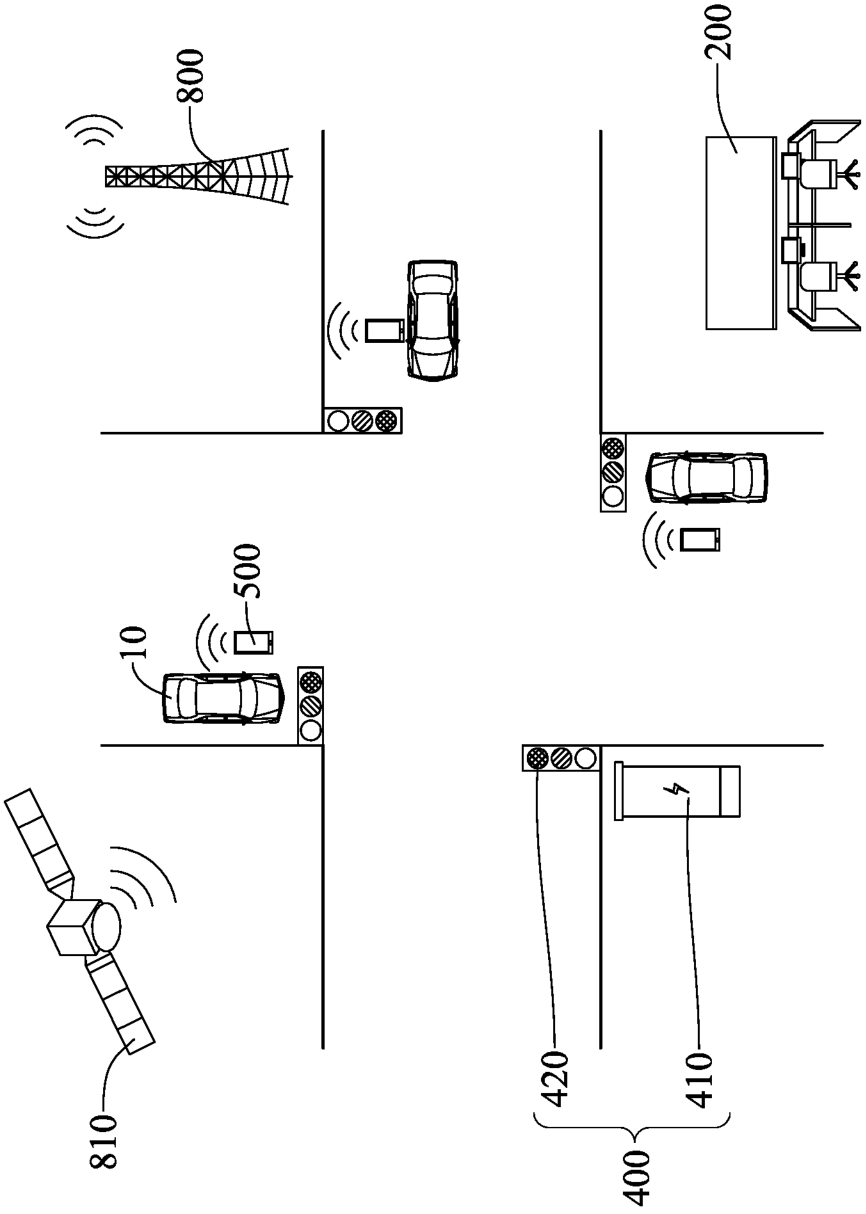
FIG. 2 is a schematic diagram showing real-time data transmission according to an embodiment of the present invention.

Please refer to FIG. 1 and FIG. 2. FIG. 2 is a schematic diagram of data transmission communication according to an embodiment of the present invention. The traffic signal control facility 400 at the intersection in FIG. 2 may include a traffic signal controller 410 and a traffic signal 420. The mobile device 500 can perform data transmission communication through a mobile communication network base station 800 or via a roadside unit 600 in order to transmit the real-time travel information (e.g. trip origin and destination points, current location, route track, . . . etc.) of a road user or from his/her vehicle 10 to the road-users' travel information input module 120. The mobile device 500 may be a navigator/navigation module imbedded in road-users' portable devices or in an on-board-unit of moving vehicles. The mobile device 500 can also receive the optimal route plan transmitted from the optimal routes output module 340 for using in the road-user's subsequent travel path.

The urban traffic control subsystem 200 can generate the real-time optimal signal timing plan for each intersection by calculating the travel information of road-users and the integrated traffic information of each road section, and transmits the real-time optimal signal timing plan to the traffic signal control facility 400 at each intersection to enable the traffic signal controller 410 to drive the traffic signal 420 into subsequent operation. The road-users' route guidance subsystem 300 can generate the real-time optimal route plan for each road-user by calculating the real-time travel information of road-users, the real-time integrated traffic information of each road section, and the real-time optimal signal timing plan of each intersection generated by the urban traffic control subsystem 200, and transmitted them to the mobile device 500 of road-users or via the roadside unit 600 for an indirect data transmission. It should be noted that the locations of the components in FIG. 2 are only examples, and are not used to limit the conditions of their erection, installation, or installation locations.

In addition, in some embodiments, the present invention is based on the premise of "real-time response". The bidirectional interactive traffic-control management system 1000 will immediately perform the update calculation of the multiple feasible timing plans and the generation of the real-time optimal timing plans according to the input frequency of the travel information sent by the road-users and it may be as short as a few seconds or as a few minutes. As for the actual update frequency of the optimal timing plans of the present invention, it highly depends on the computer computing speed of the urban traffic control subsystem 200 and the complexity of the control logic and it may be as short as a length of "Time Step" as a few seconds, or it may be equal to or exceed the length of a few minutes of a normal signal cycle length.

Similarly, the road-users' route guidance subsystem 300 will immediately perform an update calculation of the multiple feasible route plans and the generation of the real-time optimal route plan based on the input frequency of the travel information sent by the road-users and it may be as short as a few seconds or as long as a few minutes, and the generating frequency of the real-time optimal timing plan in the urban traffic control subsystem 200. As for the actual update frequency of the timing plans, it highly depends on the computer computing speed of the urban traffic control subsystem 200 and the complexity of the control logic and it may be as short as a length of "Time Step" as a few seconds, or it may be equal to or exceed the length of a few minutes of a normal signal cycle length.

Figure 3A:
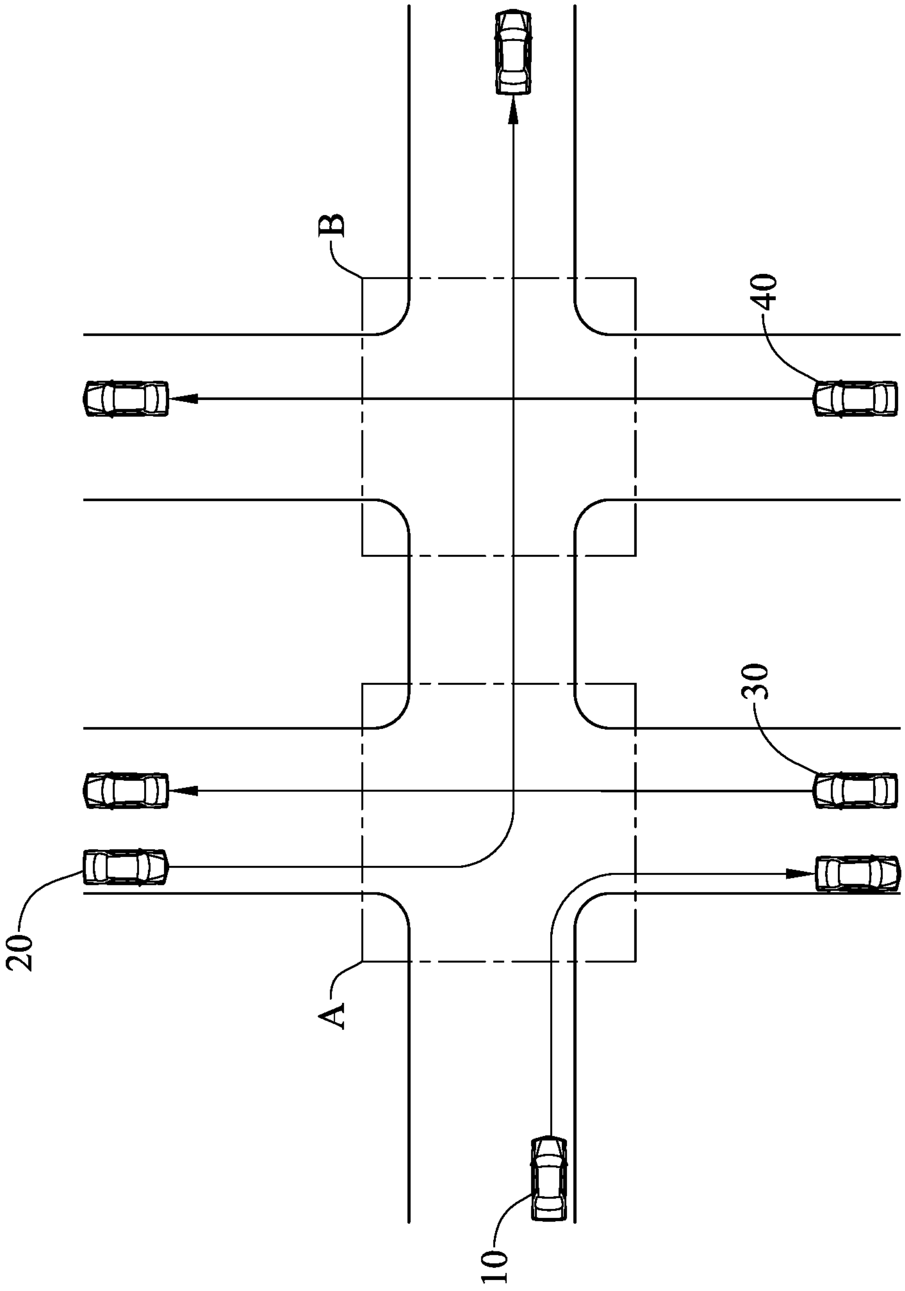
FIG. 3A is a schematic diagram showing vehicles' location under traffic control at time point to in the embodiment of the present invention.

Please refer to FIG. 3A, which is a schematic diagram of the vehicle location under traffic control at time to in one embodiment of the present invention. For the convenience of description, FIGS. 3A to 3C do not show traffic signal control facility 400 at the intersection. The vehicle 10, a vehicle 20, a vehicle 30, and a vehicle 40 transmit their respective road-user's travel information (for example, information of trip origin and destination points) to the road-users' travel information input module 120 before departure (time to), and then start to send their respective instant location and/or driving track information after departure. The bidirectional interactive traffic-control management system 1000 then traces the movement of the vehicles 10, 20, 30 and 40 based on their current location information, and predicts the number of vehicles arriving at intersection A and at intersection B at time $t_1$, and then generates two real-time optimal signal timing plans P1$_a$ and P1$_b$ separately for the intersections A and the intersection B at time $t_1$.

Figure 3B:
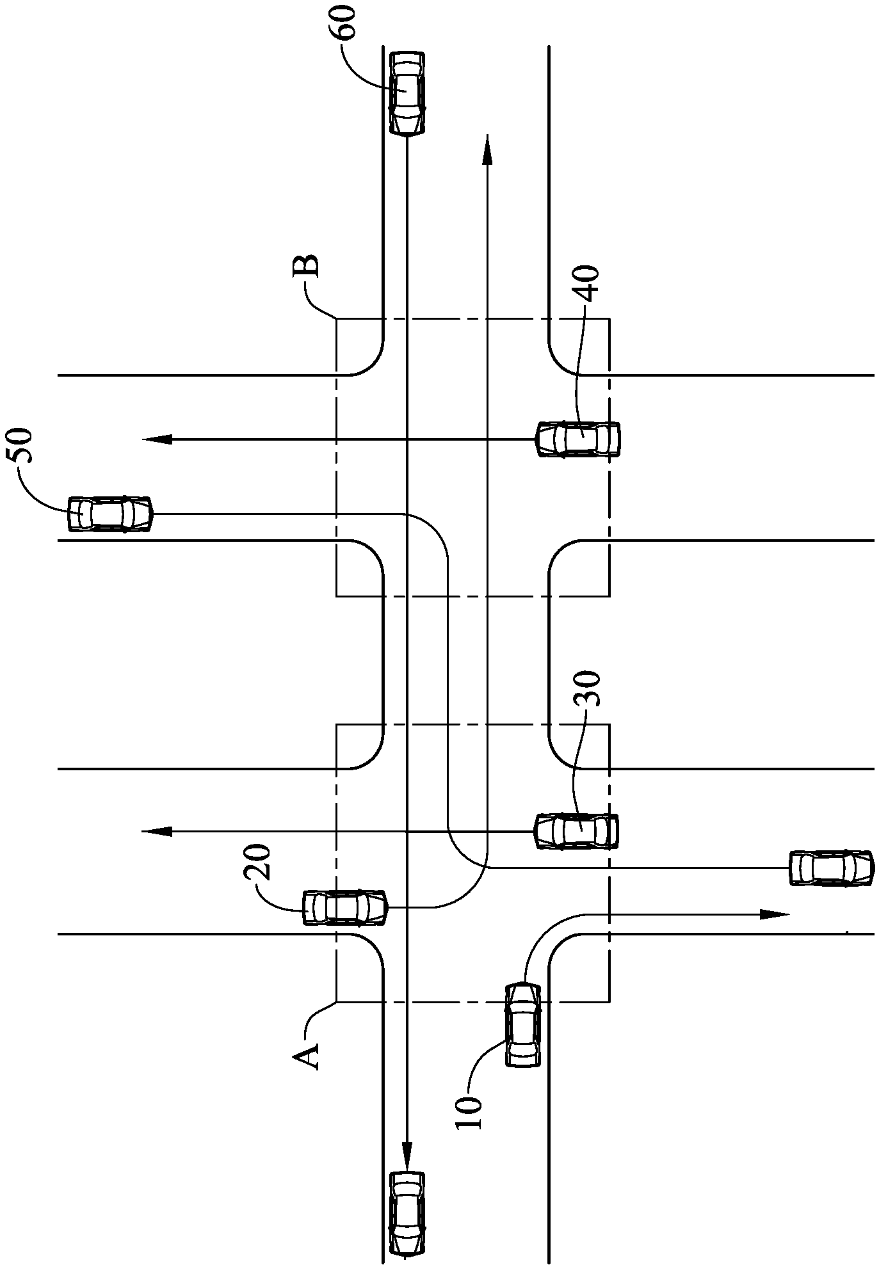
FIG. 3B is a schematic diagram showing vehicles' location under traffic control at time point $t_1$ of the embodiment of the present invention.

Please refer to FIG. 3B, which is a schematic diagram of the vehicle location under traffic control at time $t_1$ according to the embodiment of the present invention. When the vehicle 10, the vehicle 20, and the vehicle 30 travel to the intersection A, and the vehicle 40 travels to the intersection B, the bidirectional interactive traffic-control management system 1000 then causes the phase transition of the traffic signal at each intersection according to the real-time optimal signal timing plans P1$_a$ and P1$_b$ at time $t_1$, such that the vehicle 10, the vehicle 20, the vehicle 30, and the vehicle 40 would pass through the intersection A and the intersection B, respectively.

When a vehicle 50 and a vehicle 60 send their respective road-user's travel information to the road-users' travel information input module 120 before departure at time $t_1$, and start to send their instant location and/or driving track information after departure. Next, the bidirectional interactive traffic-control management system 1000 traces the movement of the vehicles 50 and 60 based on their current location information, checks the subsequent travel routes of the vehicles 10, 20, 30, and 40, and predicts the number of vehicles arriving at intersections A and B at time $t_2$ and then generates next real-time optimal signal timing plans P2$_a$ and P2$_b$ separately for the intersections A and B at time $t_2$.

Figure 3C:
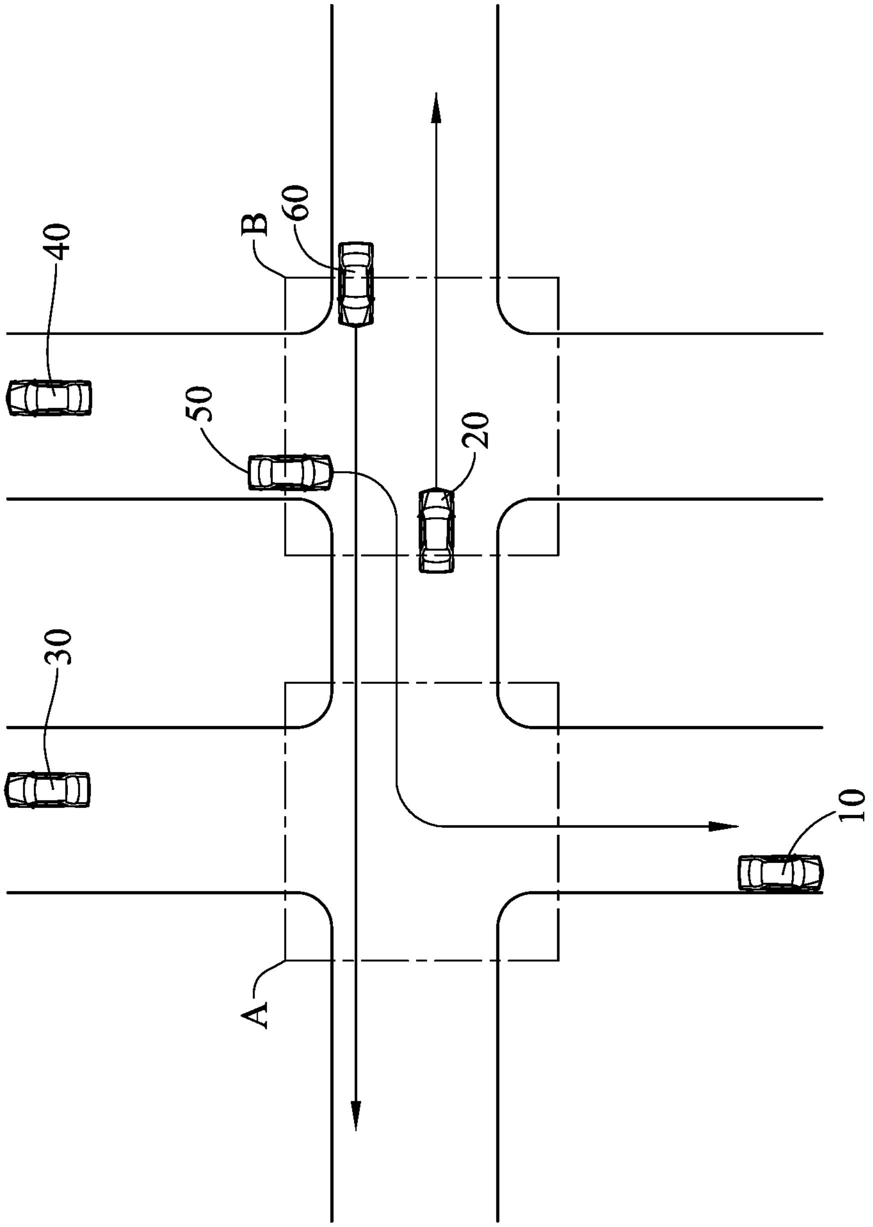
FIG. 3C is a schematic diagram showing vehicles' location under traffic control at time point $t_2$ of the embodiment of the present invention.

Next, please refer to FIG. 3C, which is a schematic diagram of the vehicle location under traffic control at time $t_2$ in one embodiment of the present invention. When the vehicle 10, the vehicle 30, and the vehicle 40 successively arrive at their destination points (trip destinations), they stop sending their instant location and driving track information. The vehicle 20, the vehicle 50, and the vehicle 60 have traveled to the intersection B, and each passes through the intersection B according to the real-time optimal signal timing plan P2$_b$ at the time $t_2$. The bidirectional interactive traffic-control management system 1000 then checks their subsequent routes of the vehicles 20, 50 and 60 based on road their instant location or driving track information, and predicts the number of vehicles arriving at intersections A and B at time $t_3$, and then generates the next real-time optimal signal timing plans P3$_a$ and P3$_b$ separately for intersections A and B at time $t_3$. From the time $t_3$ to the time $t_4$, the time $t_4$ to the time $t_5$ and so on. The above execution procedure is repeated again and again until to the time $t_n$ when the bidirectional interactive traffic-control management system 1000 is shut down or broken down for some reasons.

The above description is only illustrative, and not restrictive. Any other equivalent modifications or changes that do not depart from the spirit and scope of the present invention should be included in the scope of the claims of the present invention. As disclosed in the above description and attached drawings, the present invention can provide a bidirectional interactive traffic-control management system. It is new and can be put into official, public, and industrial use.

What is claimed is:

1. A bidirectional interactive traffic-control management system, comprising:

a server, including:

a road and traffic network information subsystem, including a digital urban traffic-control road network and a road-users' travel information input module;

an urban traffic control subsystem, being coupled with the road and traffic network information subsystem; and a road-users' route guidance subsystem, being coupled with the road and traffic network information subsystem and urban traffic control subsystem;

wherein the server is configured to executed following steps:

the digital urban traffic-control road network stores a vector-type road structure including a plurality of road sections and a plurality of intersections including various road geometric characteristics and traffic control attributes that are pre-stored;

the road-users' travel information input module receives the road-users' travel information from a mobile device through a network to collect real-time travel information of road-users on the plurality of road sections;

the collected road-users' travel information is overlaid with the road geometric characteristics and traffic control attributes that are pre-stored to form real-time integrated traffic information in the plurality of road sections and plurality of intersections of the digital urban traffic-control road network;

an urban traffic control subsystem generates a real-time optimal signal timing plan of each intersection according to the real-time integrated traffic information of all road sections which are linked together by intersections; and a road-users' route guidance subsystem generates a real-time optimal route plan of each road user who has provided travel information for navigating them to the optimal subsequent travel route by calculating the real-time travel information of all road-users, the real-time integrated traffic information of each road section, and the real-time optimal signal timing plan of each intersection; wherein the required travel information is information of the instant location of each road-user on each road section, and the trip destination point of each road-user; wherein the urban traffic control subsystem further includes a timing plans generation module for generating multiple feasible signal timing plans for each intersection of the digital urban traffic-control road network according to the time-space arrival-flows matrix or pattern of each intersection and signal timing restrictions of each intersection; wherein the urban traffic control subsystem further includes a timing plans optimization module for generating the real-time optimal signal timing plan, including all timing parameters of cycle length, green time split and offset, among the multiple feasible signal timing plans of each intersection of the digital urban traffic-control road network by optimizing an objective function of the multiple feasible signal timing plans according to a set of pre-determined traffic control objective; wherein the real-time optimal signal timing plan is updated according to the combinations of trip destination point and one of beginning location and subsequent instant location of each road-user.

2. The bidirectional interactive traffic-control management system as claimed in claim 1, wherein the real-time travel information of road-users further includes information about at least one of a traffic accident information, a traffic incident information, a traffic congestion event information, a road construction information, weather information, a driving track information, and a route choice preference information.

3. The bidirectional interactive traffic-control management system as claimed in claim 1, wherein the urban traffic control subsystem further includes an intersection arrival-flows prediction module for obtaining a real-time average vehicle speed in at least one of each road section, an estimated arrival time at each intersection, and a real-time arrival-flows allocation of each intersection according to the real-time integrated traffic information of each road section, so as to generate a time-space arrival-flows matrix or pattern of each intersection of the digital urban traffic-control road network.

4. The bidirectional interactive traffic-control management system as claimed in claim 1, wherein the signal timing restrictions of each intersection include a phasing type, a yellow period, an all-red period, a pedestrian green period, a pedestrian flashing green period, a minimum green period of each phase, and a maximum green period of each phase.

5. The bidirectional interactive traffic-control management system as claimed in claim 1, wherein the pre-determined traffic control objective is a minimum total delay time, or a minimum total travel time, or a minimum total number of stops or a minimum queue length, or a combination thereof in the digital urban traffic-control road network.

6. The bidirectional interactive traffic-control management system as claimed in claim 1, wherein the real-time optimal signal timing plan of each intersection of the digital urban traffic-control road network is transmitted to a traffic-control signal facility at each intersection.

7. The bidirectional interactive traffic-control management system as claimed in claim 1, wherein the urban traffic control subsystem further includes an electronic traffic control map display module for showing the real-time optimal signal timing plan of each intersection generated by at least one of the timing plans optimization module and the real-time average vehicle speed in each road section.

8. The bidirectional interactive traffic-control management system as claimed in claim 1, wherein the update frequency of the real-time optimal signal timing plan is determined according to at least one of the input frequency of the real-time travel information of road-users and the calculation frequency of the timing plans optimization module.

9. The bidirectional interactive traffic-control management system as claimed in claim 1, wherein the road-users' route guidance subsystem further includes a road section and intersection calculation module for calculating the real-time average vehicle speed in each road section, the estimated arrival time at each intersection, a travel time in each road section, and a delay time at each intersection based on the real-time integrated traffic information of each road section, the length of each road section, and the real-time optimal signal timing plan of each intersection of the digital urban traffic-control road network generated by the urban traffic control subsystem.

10. The bidirectional interactive traffic-control management system as claimed in claim 9, wherein the road-users' route guidance subsystem further includes an alternative routes generation module for generating multiple feasible route plans by calculating the real-time integrated traffic information of each road section, the real-time average vehicle speed in each road section, the estimated arrival time at each intersection, the travel time in each road section, and the delay time at each intersection of the digital urban traffic-control road network.

11. The bidirectional interactive traffic-control management system as claimed in claim 10, wherein the road-users' route guidance subsystem further includes a route guidance optimization module for generating the real-time optimal route plan by optimizing an objective function among the multiple feasible route plans according to a pre-determined route planning objective.

12. The bidirectional interactive traffic-control management system as claimed in claim 11, where the pre-determined route planning objective is at least one of a minimum total travel time, a minimum total travel distance and the route choice preference information.

13. The bidirectional interactive traffic-control management system as claimed in claim 1, wherein the real-time travel information of road-users is provided by the navigator/navigation module which is imbedded in road-users' mobile devices or in the OBUs (on board units) of moving vehicles, or via the roadside units.

14. The bidirectional interactive traffic-control management system as claimed in claim 11, wherein the road-users' route guidance subsystem further includes an optimal routes output module for transmitting the real-time optimal route plans to a navigator/navigation module according to the input frequency of at least one of the real-time travel information of the road-users, the calculation frequency of the route guidance optimization module, and a necessity evaluation.

15. The bidirectional interactive traffic-control management system as claimed in claim 14, wherein the necessity evaluation is used to calculate the difference between the real-time optimal route plan and the existing route plan of the road user and evaluate the difference based on a threshold value, and then to selectively transmit the real-time optimal route plan or maintain the existing route plan of the road user according to the size of the difference.

16. The bidirectional interactive traffic-control management system as claimed in claim 14, wherein the road-users' route guidance subsystem further includes a route guidance database for storing all optimal route plans generated by the route guidance optimization module, the real-time average vehicle speed of each road section, the estimated arrival time at each intersection, and the travel time in each road section, and transmitting them to at least one of the road section and intersection calculation module, the alternative routes generation module and the route guidance optimization module, for the purpose of next stage optimal route planning.

* * * * *